US011468586B2

(12) United States Patent
Ishibashi

(10) Patent No.: US 11,468,586 B2
(45) Date of Patent: Oct. 11, 2022

(54) THREE-DIMENSIONAL MEASUREMENT APPARATUS, IMAGE CAPTURING APPARATUS, CONTROL METHOD, AND RECORDING MEDIUM

(71) Applicant: CANON KABUSHIKI KAISHA, Tokyo (JP)

(72) Inventor: Takuya Ishibashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 16/815,702

(22) Filed: Mar. 11, 2020

(65) Prior Publication Data
US 2020/0294261 A1    Sep. 17, 2020

(30) Foreign Application Priority Data

Mar. 13, 2019    (JP) .............................. JP2019-046379

(51) Int. Cl.
*G06T 7/593* (2017.01)
*G06T 7/571* (2017.01)
*G06T 7/536* (2017.01)
*G06T 7/521* (2017.01)

(52) U.S. Cl.
CPC .............. *G06T 7/593* (2017.01); *G06T 7/536* (2017.01); *G06T 7/571* (2017.01); *G06T 7/521* (2017.01)

(58) Field of Classification Search
CPC ... G06T 2200/04; G06T 19/20; G06T 19/003; G06T 17/05; G06T 3/005; G06T 7/521; G06K 9/00201; G06K 9/00228; G01S 5/16; G01B 11/25
See application file for complete search history.

(56) References Cited

U.S. PATENT DOCUMENTS

| | | | | |
|---|---|---|---|---|
| 6,674,895 B2 * | 1/2004 | Rafii | ...................... | H04N 3/155 382/154 |
| 7,545,975 B2 * | 6/2009 | Kise | ....................... | G06V 20/64 382/156 |
| 7,684,052 B2 * | 3/2010 | Suwa | ....................... | G06T 7/521 356/601 |
| 7,697,750 B2 * | 4/2010 | Simmons | ................. | G06K 9/00 382/154 |
| 8,009,871 B2 * | 8/2011 | Rafii | ....................... | G06T 7/136 382/106 |
| 8,108,119 B2 * | 1/2012 | Southall | .................... | B60T 7/22 701/96 |

(Continued)

FOREIGN PATENT DOCUMENTS

JP    2011-232330 A    11/2011

*Primary Examiner* — Yosef Kassa
(74) *Attorney, Agent, or Firm* — Cowan, Liebowitz & Latman, P.C.

(57) ABSTRACT

A three-dimensional measurement apparatus determines, with respect to a captured image, a two-dimensional ranging path that is to undergo distance measurement; obtains, with respect to the captured image, distance information including information of subject distances of respective pixels in the captured image, the subject distances being distances to a subject; and derives a three-dimensional path length corresponding to the ranging path along a surface shape of the subject based on subject distances of respective pixels in the captured image that are included in the determined ranging path, and on information of an image capture condition of the captured image.

19 Claims, 12 Drawing Sheets

(56) References Cited

U.S. PATENT DOCUMENTS

| | | | | |
|---|---|---|---|---|
| 8,243,285 | B2* | 8/2012 | Fishbaine | G01N 21/8806 |
| | | | | 359/290 |
| 8,295,547 | B1* | 10/2012 | Cangiani | G01S 17/89 |
| | | | | 382/103 |
| 8,325,979 | B2* | 12/2012 | Taborowski | G01C 21/32 |
| | | | | 382/103 |
| 8,352,979 | B2* | 1/2013 | Medford | H04N 21/434 |
| | | | | 725/28 |
| 8,370,282 | B1* | 2/2013 | Leung | G06F 16/583 |
| | | | | 706/20 |
| 8,379,014 | B2* | 2/2013 | Wiedemann | G06K 9/6255 |
| | | | | 345/428 |
| 8,488,113 | B2* | 7/2013 | Thiel | G01J 3/02 |
| | | | | 356/73 |
| 8,611,604 | B2* | 12/2013 | Fujiyoshi | G06K 9/00201 |
| | | | | 382/103 |
| 9,025,857 | B2* | 5/2015 | Kotake | G06T 7/521 |
| | | | | 382/152 |
| 9,404,764 | B2* | 8/2016 | Lynch | G01C 21/3638 |
| 9,616,572 | B2* | 4/2017 | Watanabe | G06T 19/20 |
| 9,721,161 | B2* | 8/2017 | Dielacher | G06K 9/00805 |
| 2007/0139657 | A1* | 6/2007 | Ishimaru | G01B 11/2441 |
| | | | | 356/511 |

\* cited by examiner

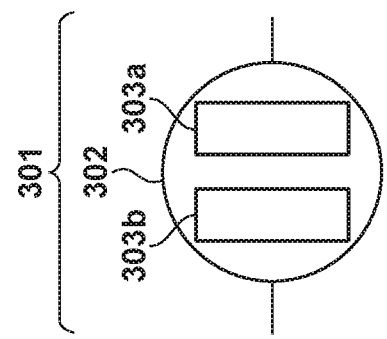
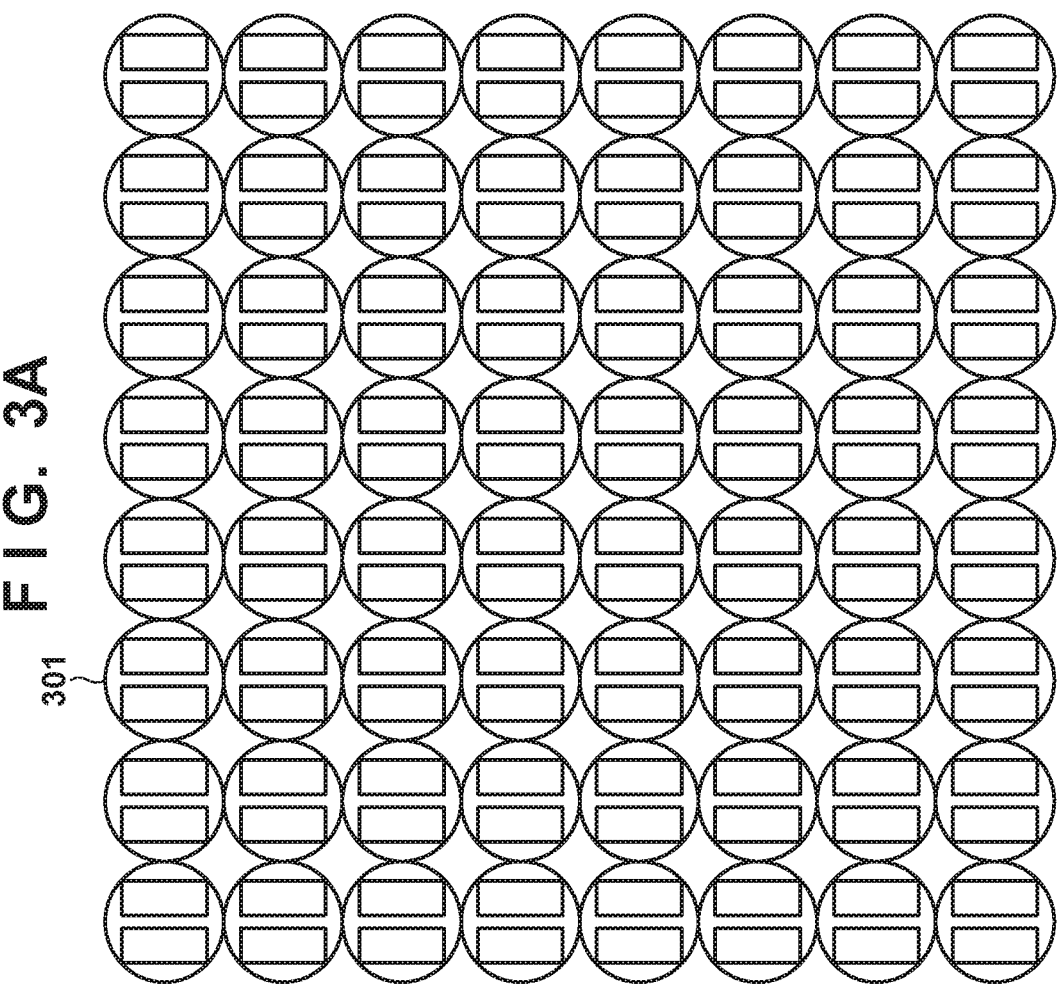

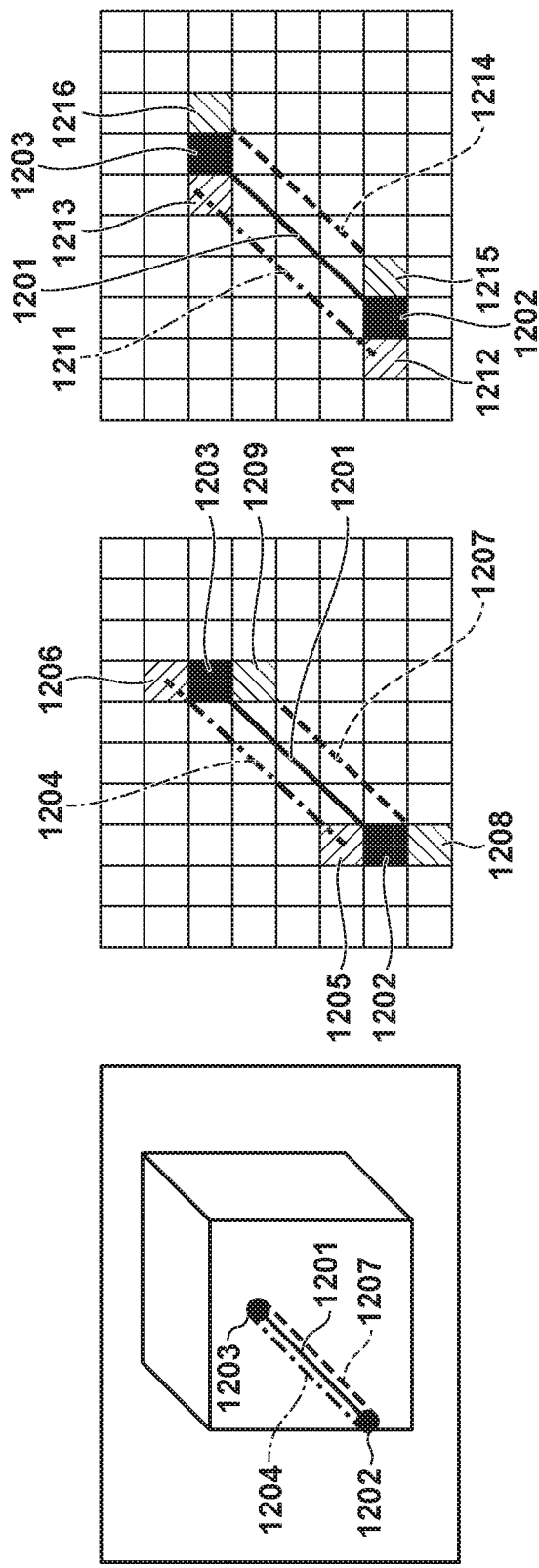

THREE-DIMENSIONAL MEASUREMENT APPARATUS, IMAGE CAPTURING APPARATUS, CONTROL METHOD, AND RECORDING MEDIUM

BACKGROUND OF THE INVENTION

Field of the Invention

The present invention relates to a three-dimensional measurement apparatus, an image capturing apparatus, a control method, and a recording medium, and especially to a technique to measure a surface length in consideration of the shape of a subject included in an image capture range.

Description of the Related Art

There is an image capturing apparatus that measures a distance between two designated points in a three-dimensional space by deriving depth information of a subject based on a pair of interrelated captured images having parallax that have captured the same subject (Japanese Patent Laid-Open No. 2011-232330).

Incidentally, the image capturing apparatus described in Japanese Patent Laid-Open No. 2011-232330 is mainly capable of measuring a linear spatial distance connecting between two points in a three-dimensional space, such as an external dimension of a subject, but cannot be used for the purpose of, for instance, measuring a path length along the surface shape of the subject.

SUMMARY OF THE INVENTION

The present invention has been made in view of the aforementioned problem, and provides a three-dimensional measurement apparatus that measures a surface length in consideration of the shape of a subject, an image capturing apparatus, a control method, and a recording medium.

The present invention in its first aspect provides a three-dimensional measurement apparatus, comprising: at least one processor; and a memory storing an instruction that, when executed by the at least one processor, causes the at least one processor to function as: a determination unit configured to determine, with respect to a captured image, a two-dimensional ranging path that is to undergo distance measurement, an obtaining unit configured to obtain, with respect to the captured image, distance information including information of subject distances of respective pixels in the captured image, the subject distances being distances to a subject, and a derivation unit configured to derive a three-dimensional path length corresponding to the ranging path along a surface shape of the subject based on subject distances of respective pixels in the captured image that are included in the ranging path determined by the determination unit, and on information of an image capture condition of the captured image.

The present invention in its second aspect provides an image capturing apparatus including an image capturing unit configured to capture a captured image and a pair of pupil-division images simultaneously, the image capturing apparatus comprising: at least one processor; and a memory storing an instruction that, when executed by the at least one processor, causes the at least one processor to function as: a generation unit configured to generate, based on the pair of pupil-division images, distance information including information of subject distances of respective pixels in the captured image, the subject distances being distances to a subject, a determination unit configured to determine, with respect to the captured image, a two-dimensional ranging path that is to undergo distance measurement, and a derivation unit configured to derive a three-dimensional path length corresponding to the ranging path along a surface shape of the subject based on subject distances of respective pixels in the captured image that are included in the ranging path determined by the determination unit, and on information of an image capture condition of the captured image.

The present invention in its third aspect provides a control method for a three-dimensional measurement apparatus, the control method comprising: determining, with respect to a captured image, a two-dimensional ranging path that is to undergo distance measurement; obtaining, with respect to the captured image, distance information including information of subject distances of respective pixels in the captured image, the subject distances being distances to a subject: and deriving a three-dimensional path length corresponding to the ranging path along a surface shape of the subject based on subject distances of respective pixels in the captured image that are included in the ranging path determined by the determining, and on information of an image capture condition of the captured image.

Further features of the present invention will become apparent from the following description of exemplary embodiments (with reference to the attached drawings).

BRIEF DESCRIPTION OF THE DRAWINGS

FIGS. 3A and 3B are diagrams for explaining a configuration of an image capturing unit 104 according to the embodiment and exemplary modifications of the present invention.

FIGS. 12A, 12B, and 12C are diagrams for explaining the derivation of a distance between pixels along the surface shape of a subject according to a second exemplary modification of the present invention.

DESCRIPTION OF THE EMBODIMENTS

Figure 1:
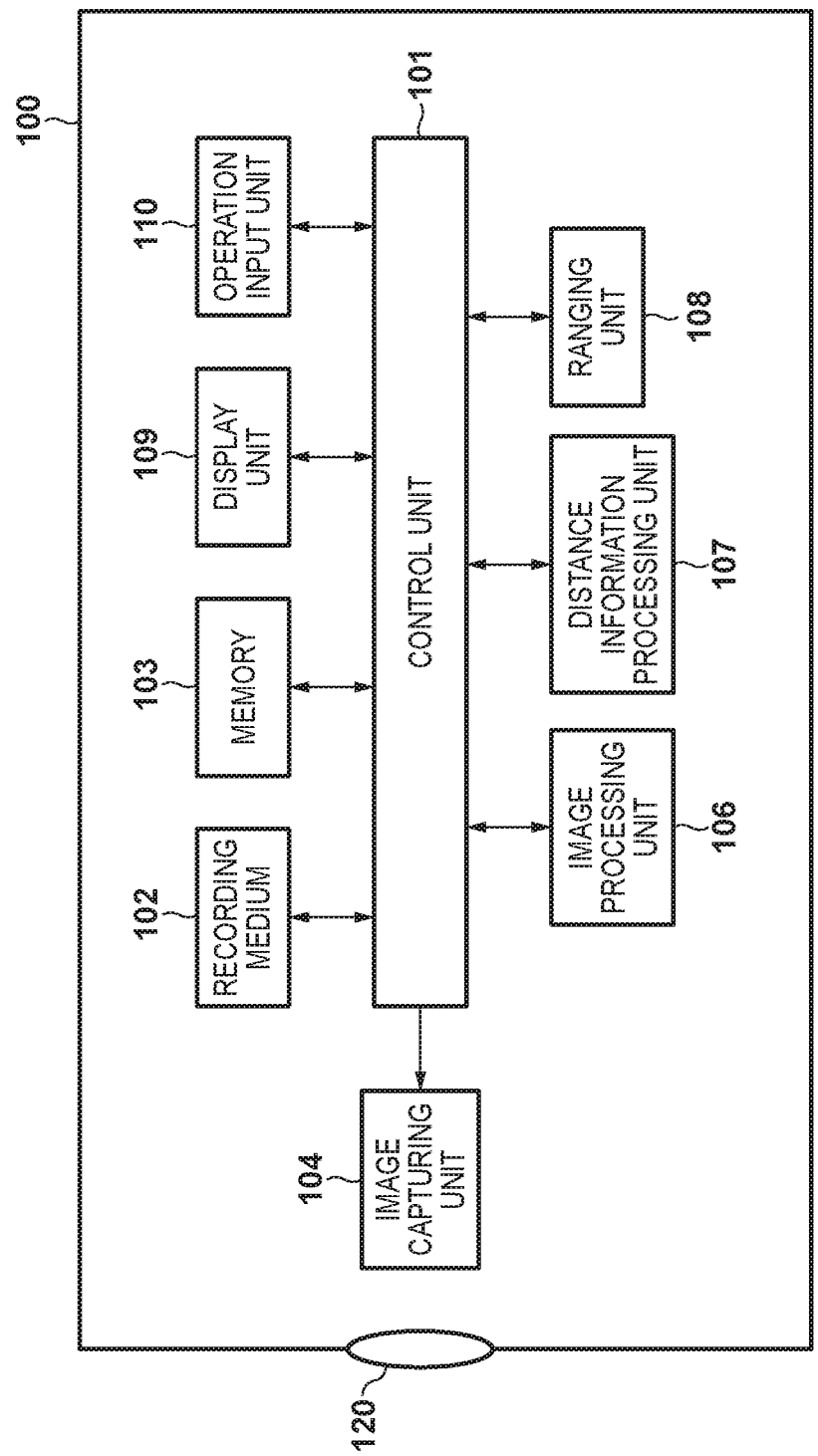
FIG. 1 is a block diagram showing a functional configuration of a digital camera 100 according to an embodiment and exemplary modifications of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

The following describes one embodiment related to an example in which the present invention is applied to a digital camera that serves as one example of a three-dimensional measurement apparatus and has a function of measuring a subject distance with respect to a subject in an image capture range. However, the present invention is applicable to any device that is configured to be capable of obtaining information of a subject distance with respect to a subject included in a captured image.

Configuration of Digital Camera

FIG. 1 is a block diagram showing a functional configuration of a digital camera 100 according to an embodiment of the present invention.

A control unit 101 is, for example, a microcomputer, and controls the operations of each block included in the digital camera 100. Specifically, the control unit 101 controls the operations of each block by, for example, reading out an operation program of each block stored in a recording medium 102, deploying the operation program to a memory 103, and executing the operation program.

The recording medium 102 is, for example, a nonvolatile memory, and stores parameters and the like necessary for the operations of each block, in addition to the operation program of each block. On the other hand, the memory 103 is a recording apparatus, such as a volatile memory, used as a working area and for temporary storage of information. The memory 103 is used not only as an area to which the operation programs are deployed, but also as a storage area for various types of data that have been output in the operations of each block or that need to be held during the operations of each block. Furthermore, it is assumed that the memory 103 also stores information of various types of settings of the digital camera 100 at the time of image capture (image capture condition information), parameters related to processing to be applied, and so on.

An image capturing unit 104 is, for example, an image sensor, such as a CCD or CMOS sensor. The image capturing unit 104 photoelectrically converts an optical image that has been formed on an image capture plane of the image sensor via an image capture optical system 120, and outputs analog image signals. The output analog image signals undergo A/D conversion performed by a non-illustrated A/D conversion unit, and are output as digital image signals (hereinafter simply referred to as a captured image (two-dimensional image)). In the present embodiment, the image capturing unit 104 functions as means for obtaining information of a subject that exists in an image capture range and is a target of measurement of a three-dimensional shape.

Figure 2:
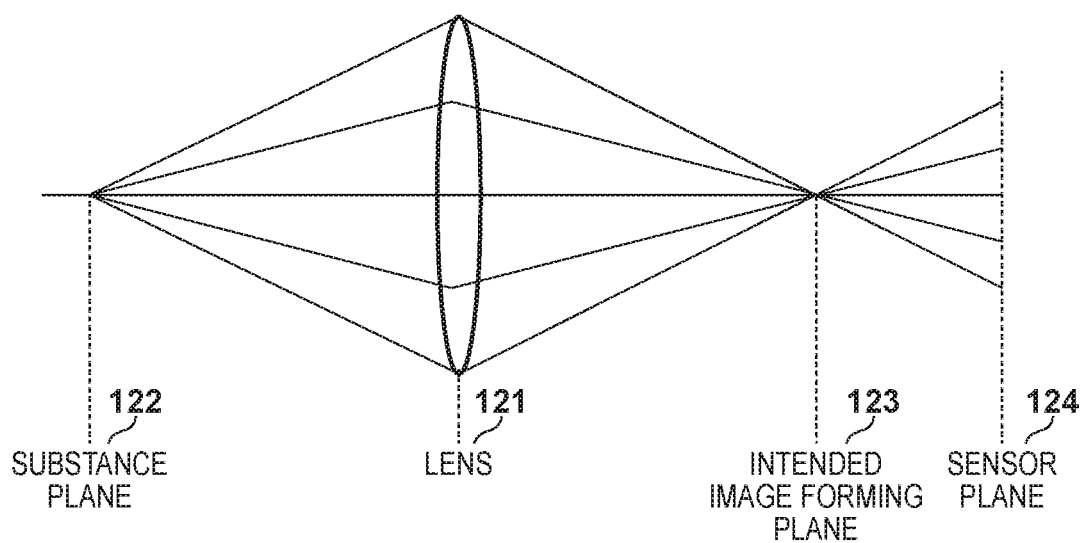
FIG. 2 is a diagram for explaining an image capture optical system according to the embodiment and exemplary modifications of the present invention.

Here, it is assumed that the image capture optical system 120 and the image capturing unit 104 are positioned so as to have a relationship shown in FIG. 2. In FIG. 2, light emitted from a substance plane 122 of an arbitrary subject is formed as an image on an intended image forming plane 123 by a lens 121 of the image capture optical system 120, and then received by a sensor plane 124, which is a light receiving plane of the image capturing unit 104.

Furthermore, the image capturing unit 104 of the present embodiment also outputs information that is necessary to derive a distance between the digital camera 100 and a subject so that the information is used in measurement of the three-dimensional shape of the subject. Output of this information may be realized by, for example, providing a plurality of photoelectric conversion units in each of pixels that are arranged two-dimensionally on the image sensor in the image capturing unit 104 as shown in FIG. 3A. More specifically, as shown in an enlarged view of a structure of one pixel 301 of the image sensor in FIG. 3B, one pixel is composed of a microlens 302 and a pair of photoelectric conversion units 303a and 303b. According to this configuration, pupil division is realized as light beams incident on each pixel are received by each of the photoelectric conversion units 303a and 303b through the microlens 302, and a captured image group (an A image and a B image) related to the light beams incident from two types of directions can be obtained in a single incidence of image capture. Here, it is assumed that the A image refers to an image that is obtained by the photoelectric conversion of incident light beams performed by the group of photoelectric conversion units 303a included in the image capturing unit 104, and the B image refers to an image that is obtained by the photoelectric conversion of incident light beams performed by the group of photoelectric conversion units 303b. Therefore, the pair of A image and B image obtained in a single incidence of image capture has a relationship of an image group that has captured a subject from different directions under the same image capture conditions, and a distance between the digital camera 100 and the subject can be derived from a difference between the images as will be described later. Note that compositing this pair of A image and B image (pupil division images: an image group having parallax) can obtain an image (an AB image: an image that reproduces a state where pupil division has not been performed) that corresponds to the aforementioned captured image.

Furthermore, although the present embodiment is described under the assumption that the image capturing unit 104 uses the image sensor having a structure shown in FIGS. 3A and 3B so that the image capturing unit 104 outputs information necessary to derive a distance between the digital camera 100 and a subject, the present invention is not limited to being embodied in this manner. It goes without saying that the method used to derive a distance between the digital camera 100 and a subject can be replaced by another method, such as a method that performs measurement using a laser rangefinder and the like, a method that performs triangulation using a binocular image capturing apparatus, and so on.

Therefore, the image capturing unit 104 of the present embodiment outputs a captured image and an image group having parallax in order to obtain distance information of a depth direction of a subject included in an image capture range. Although the details will be described later, it is assumed that, in a mode that uses a group of a plurality of captured images that have been captured under different conditions of shooting environments in order to derive a normal to a subject, the corresponding number of captured images and image groups having parallax are output.

An image processing unit 106 obtains the captured image output from the image capturing unit 104, and stores the captured image into the memory 103. In addition, the image processing unit 106 executes various types of image processing, such as conversion into a luminance image, with respect to the captured image.

Based on the obtained image group having parallax, a distance information processing unit 107 generates distance information that includes subject distances and information necessary to derive the subject distances and that has a pixel structure corresponding to the captured image. When this is performed based on the image group having parallax (the A image and the B image) as in the present embodiment, for example, values derived as follows may be included.

Figure 4A:
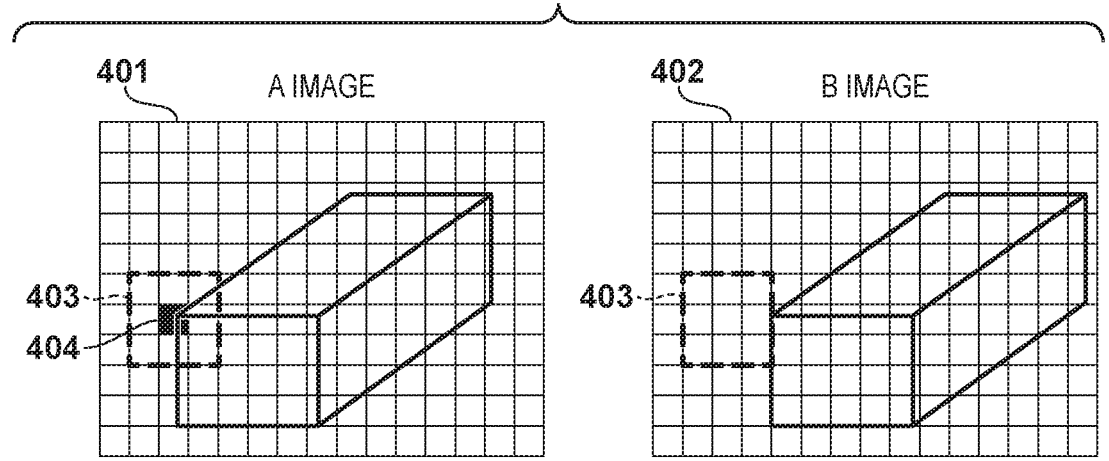
FIGS. 4A and 4B are diagrams for explaining the generation of distance information according to the embodiment and exemplary modifications of the present invention.

The information included in the distance information may be image displacement amounts of respective pixels in the A image and the B image. Deriving the image displacement amounts include, for example, processing for dividing an A image 401 and a B image 402 into minute blocks 403 indicated by dash lines as shown in FIG. 4A. For example, provided that each pixel of the target A image 401 serves as a target pixel 404, the minute block 403 may be set with respect to a region of a preset size centered at the pertinent pixel. Although the minute block 403 is set with respect to a square region of 3×3 pixels centered at the target pixel 404 in the example shown in FIG. 4A, the minute block 403 may have any shape and size. Furthermore, the minute block 403 is set for each target pixel 404, and overlapping of the minute block 403 may occur among different target pixels 404.

For example, when the minute block 403 has been set with respect to each pixel of the A image and the B image, correlation computation processing is performed for each pixel (target pixel 404) between the two images, and a displacement amount of an image included in the minute block 403 corresponding to the pertinent pixel (an image displacement amount) is derived. When the number of data pieces (pixels) in the (pair of) minute blocks 403 that have been determined with respect to the target pixels 404 of the same position in the A image and the B image is m, pixel data pieces in this pair of minute blocks 403 are respectively expressed as E(1) to E(m) and F(1) to F(m). In this case, provided that a (data) displacement amount is k (integer) [pixels], a correlation amount C(k) can be derived in the correlation computation as follows.

$$C(k)=\Sigma|E(n)-F(n+k)|$$

Figure 4B:
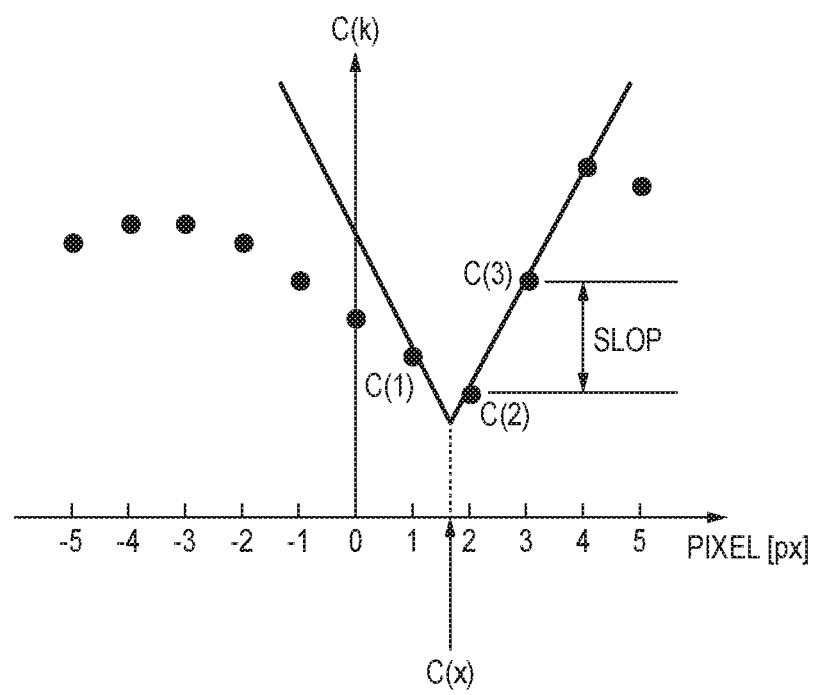

Here, it is assumed that the Σ computation is performed with respect to n, and n and n+k are limited to the range of 1 to m. Furthermore, the displacement amount k is a relative shift amount that uses a detection pitch of a pair of image data pieces as a unit. When a correlation amount is derived with respect to a pair of pupil division images (a pair of minute blocks 403) in relation to one target pixel 404 in the foregoing manner, displacement amounts k and correlation amounts C(k) have, for example, a discrete relationship shown in a graph of FIG. 4B. At this time, as the smallest correlation amount C(k) corresponds to an image displacement amount having the highest correlation, an image displacement amount x that creates the smallest value C(x) in connection with continuous correlation amounts is derived using the following three-point interpolation method.

$$x=kj+D/\mathrm{SLOP}$$

$$C(x)=C(kj)-|D|$$

$$D=\{C(kj-1)-C(kj+1)\}/2$$

$$\mathrm{SLOP}=\mathrm{MAX}\{C(kj+1)-C(kj),C(kj-1)-C(kj)\}$$

Here, kj is the displacement amount k that corresponds to the smallest discrete correlation amount C(k). The x obtained in the foregoing manner is included in the distance information as an image displacement amount at one target pixel 404. It is assumed that the unit of the image displacement amount x is also [pixel].

Figure 5:
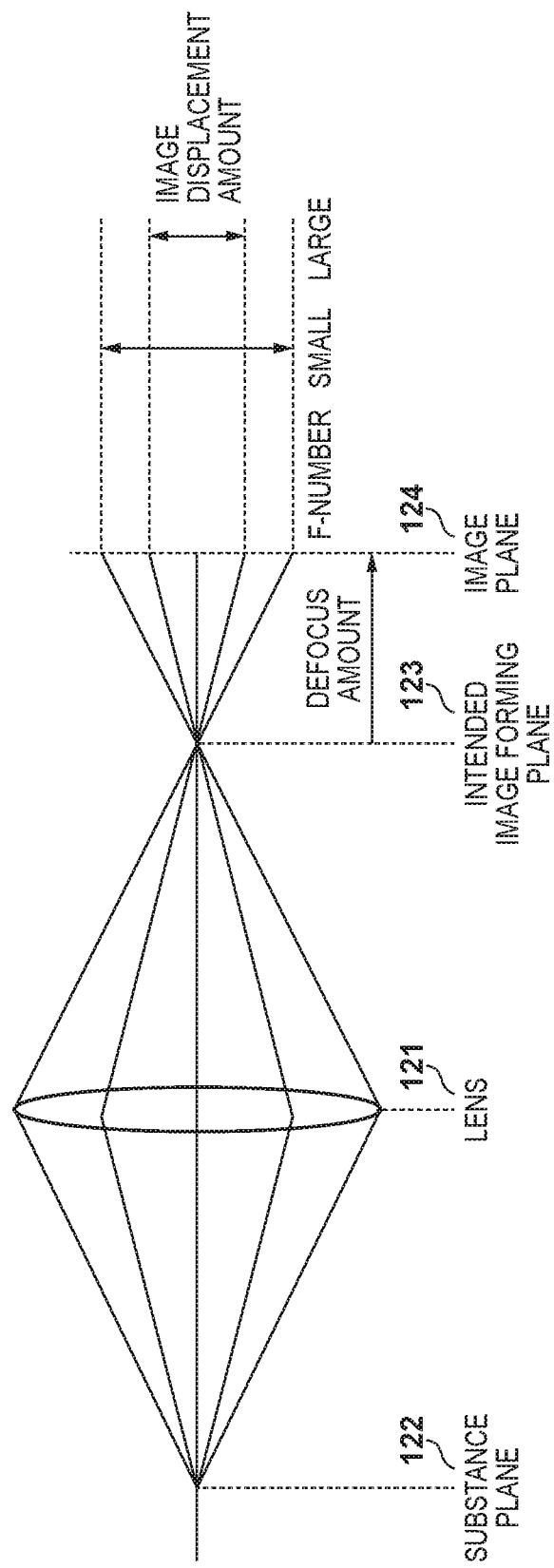
FIG. 5 is another diagram for explaining the generation of distance information according to the embodiment and exemplary modifications of the present invention.

Furthermore, the information included in the distance information may be defocus amounts indicating a difference between the intended image forming plane 123, on which light beams from the substance plane 122 are formed via the lens 121, and the sensor plane 124 as shown in FIG. 5. A defocus amount DEF at each target pixel 404 can be derived using the image displacement amount x as follows.

$$\mathrm{DEF}=KX\cdot PX\cdot x$$

Here, PX is a pixel pitch of the image sensor (a distance between pixels that compose the image sensor, based on a unit [mm/pixel]), and KX is a conversion coefficient that is determined by the magnitude of the aperture angle of the center of mass of light beams passing through a pair of ranging pupils. It is assumed that the magnitude of the aperture angle of the center of mass of light beams passing though the pair of ranging pupils is determined in accordance with information of settings at the time of image capture as it changes in accordance with the magnitude of the diaphragm aperture of the lens (f-number). As shown in FIG. 5, even with the same defocus amount, the image displacement amount x on the sensor plane 124 increases as the f-number increases (the diaphragm closes), and decreases as the f-number decreases (the diaphragm opens). Therefore, in deriving the defocus amount, it is necessary to use KX corresponding to the f-number.

Repeating the calculation while shifting a target pixel position on a pixel-by-pixel basis in the foregoing manner enables the calculation of the defocus amount of a subject at each pixel of the captured image.

Furthermore, a subject distance length indicating an actual distance from the sensor plane 124 to a subject indicated by each target pixel 404 can be derived by the following expressions, using the defocus amount DAF derived in the foregoing manner.

$$\mathrm{dist}=1/(1/(\mathrm{dist}\_d+\mathrm{DEF})-1/f)$$

$$z=\mathrm{length}-\mathrm{dist}$$

Here, dist is a distance from a front principal point of the lens 121 of the image capture optical system 111 to a subject, dist_d is a distance from a rear principal point of the lens 121 to the sensor plane 124, and f is a focal length that was set at the time of capturing the group of the pair of pupil division images.

Once the distance information processing unit 107 has generated the distance information by performing various types of computations in the foregoing manner, it stores the distance information into the memory 103.

Although the present embodiment is described under the assumption that the subject distances are derived in the foregoing manner as the structure of the image capturing unit 104 uses the photoelectric conversion units 303 shown in FIGS. 3A and 3B, the calculation of the subject distances is not limited to this.

For example, instead of outputting an image group having parallax using the pupil division of the image capturing unit 104, a plurality of image sensors that capture images of a subject without performing the pupil division may be provided, and the subject distances may be derived based on the captured images that have been respectively output from the plurality of image sensors. In this case, the plurality of image sensors may be provided in one camera housing that includes a plurality of image capture optical systems, or may be provided in a plurality of different camera housings. Alternatively, the subject distances may be calculated using a plurality of captured images that have been obtained by performing image capture while moving a camera housing that includes one image sensor.

Alternatively, for example, a distance D from a focal point to a subject can be obtained as follows, without using the foregoing two captured images, based on a focal length fat the time of image capture and a lateral magnification ratio D1:D2.

$$D=(D1/D2)\times f$$

Regarding the lateral magnification ratio, corresponding values can be held as a table based on an optical geometric relationship, such as the position of a focusing lens at the time of shooting, and the distance D from the focal point to the subject can be calculated using the lateral magnification ratio corresponding to the position of the focusing lens at the time of shooting. Therefore, the distance length from the sensor plane 124 to the subject can be derived as follows.

$$length=D+f$$

In addition, the present invention can be realized as long as the configuration enables the obtainment of information of a depth direction in correspondence with each pixel of a captured image with respect to each subject included in an image capture range using a laser rangefinder or another external measurement apparatus as described above.

A ranging unit 108 is a block that realizes distance measurement with respect to a subject included in an image capture range based on the captured image and the distance information. As will be described later, the digital camera 100 of the present embodiment is configured to be capable of at least deriving the length of a three-dimensional path that connects between, along the surface shape of the subject, two arbitrary points that have been selected as a measurement target with respect to the captured image. The path length measured by the ranging unit 108 is not limited to a path that is determined along the surface shape of the subject when linearly connecting between two points in the captured image. For example, the path length may be simply a spatial distance (Euclidean distance) between two points as in Patent Literature 1, or may be a path length that is included between, along the surface shape of the subject, a start point and an end point of a designated path.

A display unit 109 is a display apparatus that is included in the digital camera 100 and may be, for example, an LCD and the like. In the present embodiment, in consideration of convenience, the display unit 109 is described as being integrally built in the digital camera 100. However, the present invention is not limited to being embodied in this manner, and the display unit 109 may be, for example, a display apparatus that is removably connected, either via a wire or wirelessly, to the exterior of the digital camera 100. It is assumed that the display unit 109 functions as a so-called electronic viewfinder by sequentially displaying captured images that are intermittently output from the image capturing unit 104 (through-the-lens display).

An operation input unit 110 is a user interface that is included in the digital camera 100 and is, for example, a button and the like. Upon detecting an operational input that has been made by a user, the operation input unit 110 outputs a control signal corresponding to this operational input to the control unit 101. In the present embodiment, the display unit 109 is a touchscreen that is configured to enable a touch operation, and the operation input unit 110 also detects a touch operation via a touchscreen sensor provided in the display unit 109.

The present embodiment is described under the assumption that processing is realized by a circuit and a processor corresponding to each block that is included in the digital camera 100 as hardware. However, the present invention is not limited to being embodied in this manner, and processing of each block may be realized by a program that executes processing similar to each block.

Measurement Processing

Figure 6:
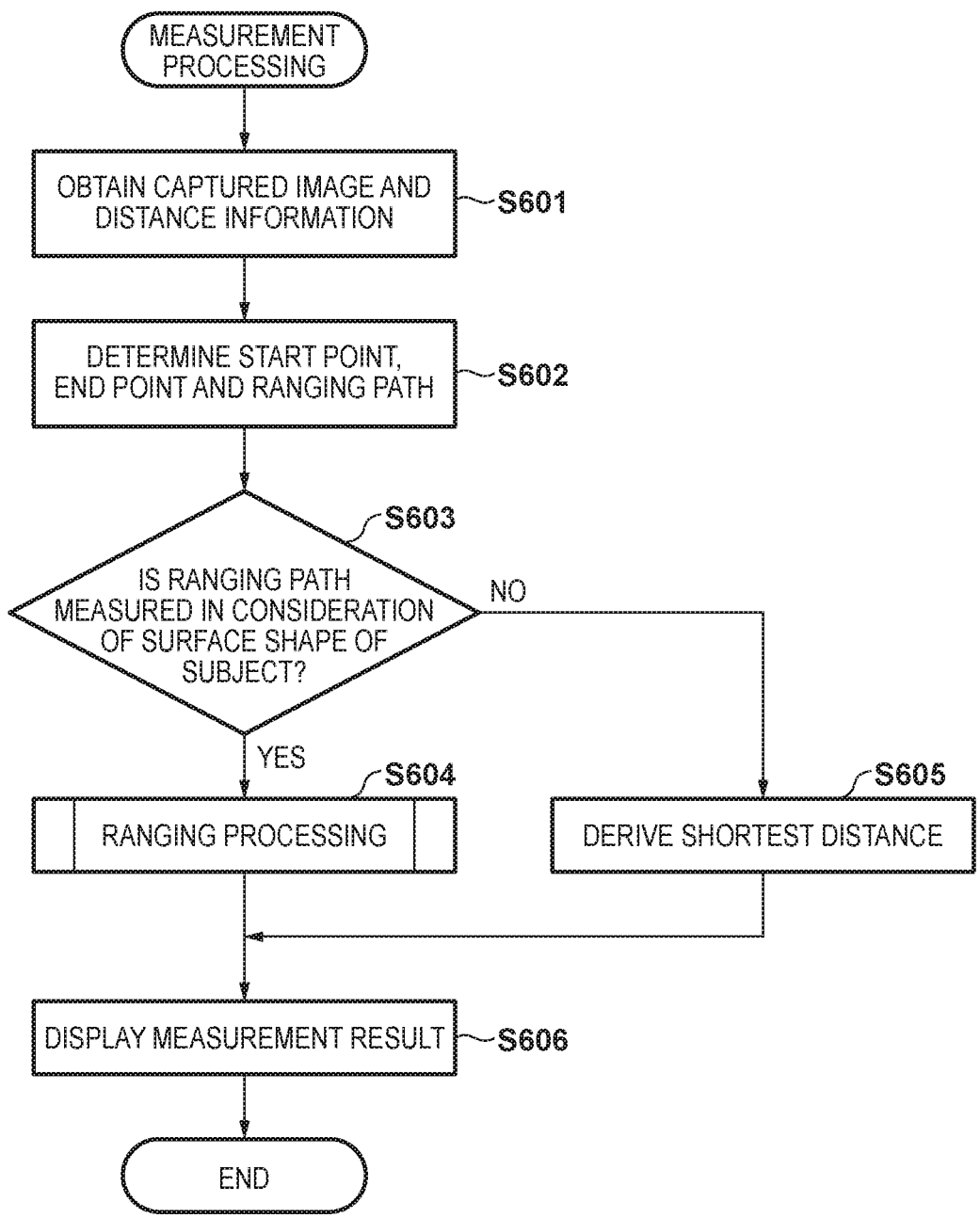
FIG. 6 is a flowchart exemplarily showing measurement processing that is executed by the digital camera 100 according to the embodiment and exemplary modifications of the present invention.

A description is now given of the specifics of measurement processing that is executed by the digital camera 100 of the present embodiment configured in the foregoing manner, using a flowchart of FIG. 6. Processing corresponding to this flowchart can be realized by, for example, the control unit 101 reading out a corresponding processing program stored in the recording medium 102, deploying the processing program to the memory 103, and executing the processing program. The present measurement processing is described under the assumption that it is started upon, for example, selection of a mode that accepts an instructional input for distance measurement with respect to a captured image displayed on the display unit 109.

Although the present embodiment is described under the assumption that, for simplicity, a user performs a touch operation with respect to the display unit 109 to designate two points (a start point and an end point) as a target of distance measurement, the present invention is not limited to being embodied in this manner. The start point and the end point for distance measurement may be determined to be, for example, two points having characteristic amounts of the largest magnitudes by way of subject recognition without the user's operational input, or may be fixed at preset pixel positions. Therefore, in embodying the present invention, the user's operational input is not indispensable in selecting two points as a target of distance measurement.

In step S601, the control unit 101 obtains captured images and corresponding distance information with respect to a subject targeted for measurement of the three-dimensional shape. More specifically, the control unit 101 causes the image capturing unit 104 to perform necessary image capture and output a predetermined number of captured images (RGB color images, including a pair of pupil-division images). Based on the pair of pupil-division images output from the image capturing unit 104, the distance information processing unit 107 derives image displacement amounts, defocus amounts, and subject distances, and generates the distance information.

In step S602, the control unit 101 accepts an operational input that determines two points (a start point and an end point) and a path (ranging path) thereof as a target of distance measurement. As stated earlier, the description is given under the assumption that, in the digital camera 100) of the present embodiment, the two points that serve as the target of distance measurement are determined based on the user's operational input (touch operation) with respect to a captured image. For example, the two points and the path that serve as the target of distance measurement may be determined as shown in FIGS. 7A, 7B, and 7C.

Figure 7A:
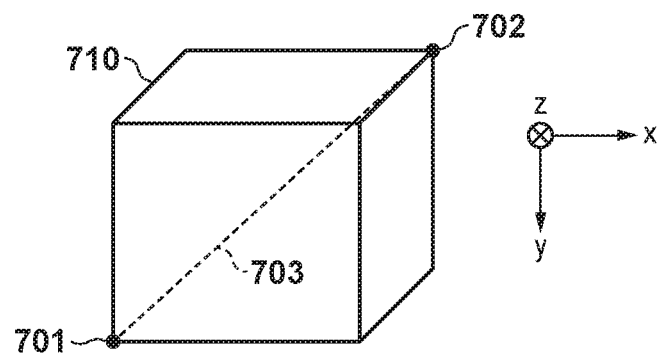
FIGS. 7A, 7B, and 7C are diagrams for explaining the determination of a ranging path according to the embodiment and exemplary modifications of the present invention.

As shown in FIG. 7A, using a touch operation that involves tapping, the user selects a start point 701 and an end point 702 of a path for distance measurement with respect to a captured image displayed on the display unit 109. At this time, while the path for distance measurement is a path 703, it is not intended to measure a linear three-dimensional distance between the positions corresponding to these points in a real space. To simplify the explanation, assume that a subject is a cuboid 710, and the start point 701 and the end point 702 have been selected as shown in FIG. 7B, which is a perspective from a viewpoint different from the image capturing direction. At this time, the path 703 is not a line segment 711 that linearly connects between them in a three-dimensional space, but is a line segment 712 that appears on the surfaces of the cuboid 710 when this line segment 711 is projected in the direction of the digital camera 100 (the direction directly facing the image capturing direction).

Although the present embodiment is described under the assumption that such an operational input designating two points determines a path as a target of distance measurement that reflects the recessed/protruding shape of the subject, the present invention is not limited to being embodied in this manner. For example, as shown in FIG. 7C, a path to be measured may be designated by a touch operation that involves swiping, a trajectory 721 created by such swiping may be used as the path, and its edge points may be determined as a start point 722 and an end point 723. In this mode, the user can directly select a desired path to be measured along the surface shape of a subject.

Figure 7B:
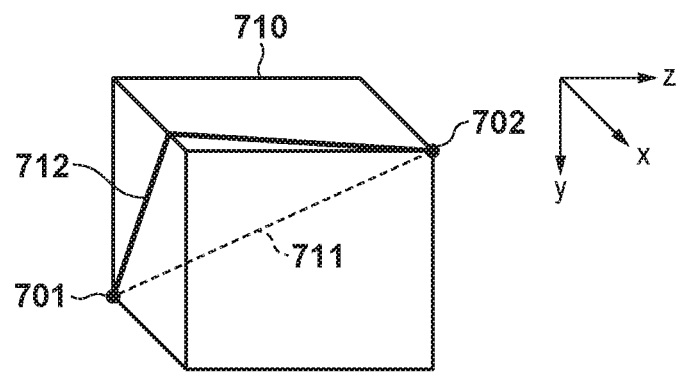
Figure 7C:
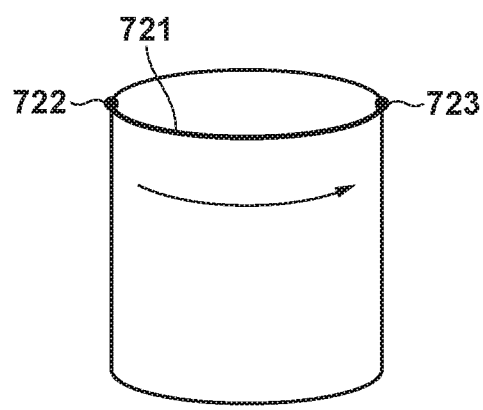

The examples shown in FIGS. 7A, 7B, and 7C illustrate a method of measuring a path length between arbitrary two points on a subject along the surface shape of the subject, that is to say, while taking into account the recessed/protruding shape of the subject, in addition to this, the shortest spatial distance connecting between two points may simply be measurable similarly to Patent Literature 1. For example, as to which distance is to be measured, it is possible to adopt a configuration in which the shortest spatial distance is measured when two points have been designated by a single tap, whereas a path length along the surface shape of a subject is measured when two points have been designated by a double tap or a path has been designated by a swipe.

Upon accepting the operational input, the control unit 101 stores, into the memory 103, information of two-dimensional coordinates of the two points targeted for distance measurement on the captured image and a path for distance measurement (ranging path), which is determined in accordance with the method of the operational input that was used in determining these two points; then, processing proceeds to step S603. Here, the ranging path is a two-dimensional path that is determined by connecting between the two points, namely the start point and the end point, on the captured image.

In step S603, the control unit 101 determines whether the ranging path that was determined in step S602 is a path that is to be measured in consideration of the surface shape of the subject. Similarly to the determination of the ranging path, the determination in the present step may be made based on which method was used in the operational input related to the designation of the start point and the end point of the ranging path. If the control unit 101 determines that the ranging path is the path that is to be measured in consideration of the surface shape of the subject, processing proceeds to step S604, and if the control unit 101 determines that the ranging path does not need consideration of the surface shape of the subject, that is to say, the ranging path is simply the shortest path connecting between the two points, processing proceeds to step S605.

In step S604, under control of the control unit 101, the ranging unit 108 executes ranging processing for deriving the path length in consideration of the surface shape of the subject with respect to the path (ranging path) that was determined in step S602.

Ranging Processing

Figure 8:
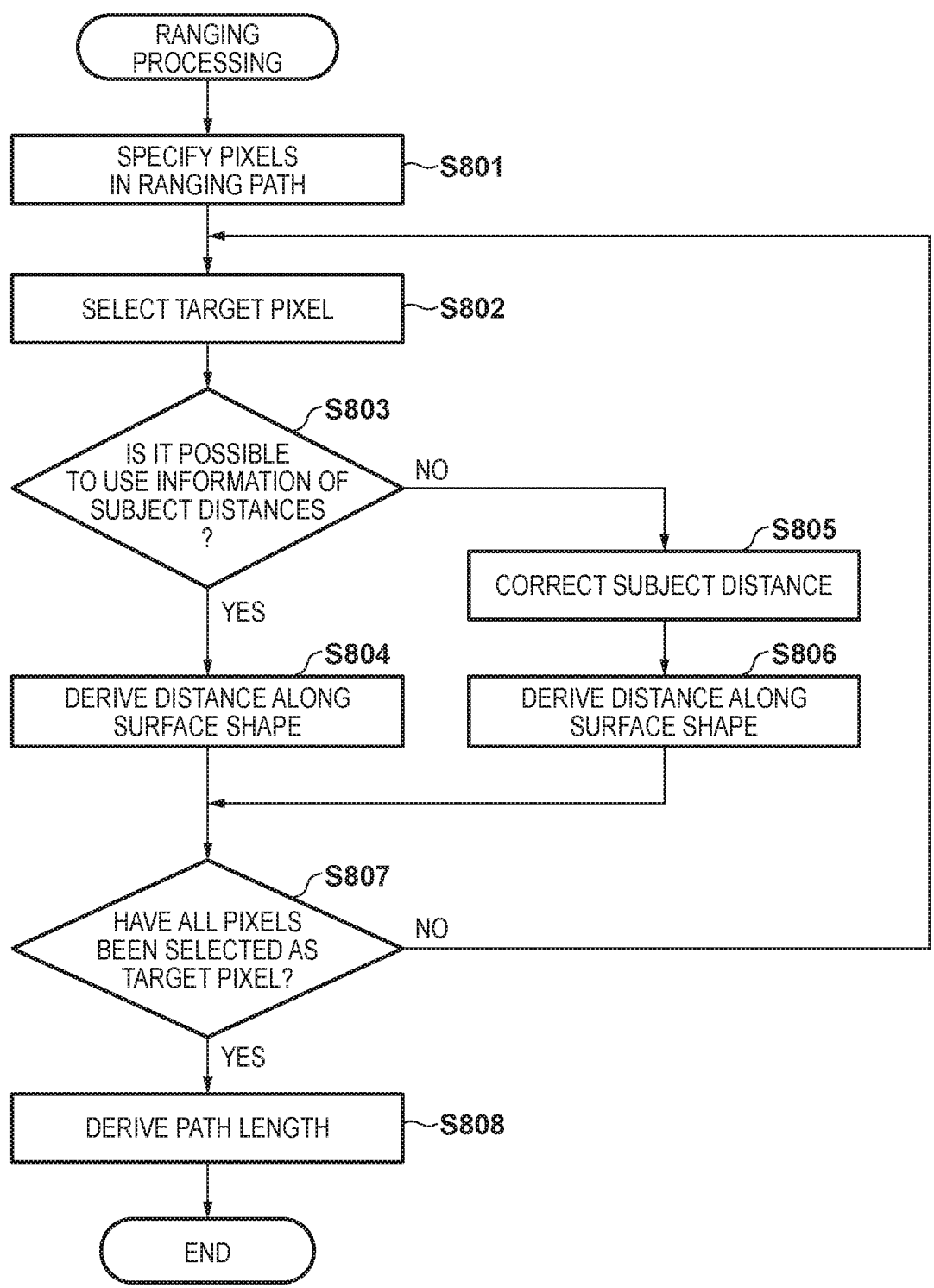
FIG. 8 is a flowchart exemplarily showing ranging processing that is executed by the digital camera 100 according to the embodiment of the present invention.

A description is now given of the details of the ranging processing executed in the present step with reference to a flowchart of FIG. 8.

In step S801, the ranging unit 108 specifies pixels that are included in the ranging path within the captured image. For simplicity, the following description is given under the assumption that the ranging path extends on one axis in the vertical or horizontal direction within the captured image. That is to say, it is assumed that the ranging path is composed of a pixel group having the same vertical coordinate, or a pixel group having the same horizontal coordinate, within the captured image. Once the ranging unit 108 has specified all of the pixels included in the ranging path, it stores information of these pixels into, for example, the memory 103.

In step S802, the ranging unit 108 selects, from among the pixels included in the ranging path, one pixel that has not been selected as a target pixel. Here, it is assumed that the ranging unit 108 sequentially selects pixels one by one as the target pixel, starting with the pixel at the start point of the ranging path. It is also assumed that in the ranging processing of the present embodiment, for the sake of expediency, pixels that are selected as the target pixel are pixels other than the pixel existing at the position of the end point among the pixels included in the ranging path.

In step S803, with respect to two pixels composed of the target pixel and the pixel that exists next to this target pixel on the ranging path (the next pixel), the ranging unit 108 determines whether it is possible to use information of subject distances of these pixels in the distance information corresponding to the captured image. In the digital camera 100 of the present embodiment, the distance information obtained in correspondence with the captured image includes reliability degrees with respect to subject distances that are stored for respective pixels, and the ranging unit 108 makes the determination in the present step based on these reliability degrees.

Here, it is assumed that a reliability degree of a subject distance is a parameter that indicates the accuracy of the subject distance stored in the distance information using an evaluation value, and is determined based on the process of derivation of the subject distance. In the present embodiment, it is assumed that an evaluation value related to a reliability degree is derived based on the luminance, contrast, and defocus amount of a pertinent pixel in an image group having parallax that was used to derive subject distances, and the evaluation value is exemplarily described as follows.

When an image signal is too bright or too dark in a region that includes the pertinent pixel in the image group having parallax, characteristics for specifying a matching subject image are less likely to appear, and the precision of calculation of an image displacement amount could possibly decrease. Therefore, an evaluation value $E_L$ based on luminance may be derived as follows, using a median value of luminances in the captured image as $L_m$, and a luminance value of the target pixel as $L_p$.

$$E_L=-|L_m-L_p|$$

In this way, a subject distance that has been derived with respect to a pixel having luminance that has deviated from the median value of luminances can be treated as a subject distance with a low reliability degree.

Similarly, in a region that includes the pertinent pixel in the image group having parallax, an image signal with lower contrast could possibly lead to loss of characteristics, and hence to a reduction in precision when deriving the smallest value from among the correlation amounts C(k). Therefore, the dispersion of luminances of the target pixel and nearby pixels in the captured image may be used as an evaluation value $E_B$ based on contrast.

Furthermore, in a region in which the degree of focus at the time of image capture is low, a subject image is blurry in the captured image and a defocus amount is large, resulting in a reduction in the precision of a subject distance. Therefore, an evaluation value $E_D$ based on a defocus amount may be derived as follows using a defocus amount DEF that has been derived with respect to the target pixel.

$$E_D=|DEF|$$

Thus, in the present embodiment, it is assumed that a reliability degree $E_M$ with respect to a pixel is derived using a sum of these evaluation values as follows.

$$E_M=E_L+E_B+E_D$$

However, derivation of a reliability degree need not be determined based on the evaluation values of the luminance, contrast, and defocus amount: at least one of them may be used, or derivation of a reliability degree may be determined further in consideration of an evaluation value of another element.

The ranging unit 108 determines whether it is possible to use the information of the subject distances by evaluating whether the reliability degrees of the target pixel and the next pixel are high or low based on whether the evaluation values related to the reliability degrees exceed a preset threshold. In other words, if the evaluation values related to the reliability degrees exceed the threshold, the ranging unit 108 considers the reliability degrees high, and determines that it is possible to use the information of the subject distances associated with the pixels as-is. On the other hand, if the evaluation values related to the reliability degrees fall below the threshold, the ranging unit 108 considers the reliability degrees low, and determines that it is not possible to use the information of the subject distances associated with the pixels as-is.

Therefore, if the ranging unit 108 determines that it is possible to use the information of the subject distances associated with both of the target pixel and the next pixel, processing proceeds to step S804, and if the ranging unit 108 determines that it is not possible to use the information of at least one of the subject distances, processing proceeds to step S805.

Although the present embodiment is described under the assumption that a reliability degree of information of a subject distance is derived based on the luminance, contrast, and defocus amount as described above, the present invention is not limited to being embodied in this manner. For example, in a mode that measures a subject distance using optical ranging means, such as a laser rangefinder, if the attenuation rate of the amplitude of detected reflected waves from a subject is higher than a prescribed value, control may be performed to reduce an evaluation value of a reliability degree of its distance information. In this way, an evaluation criterion for a reliability degree of a subject distance may be set differently depending on a method of obtaining distance information.

Figure 9A:
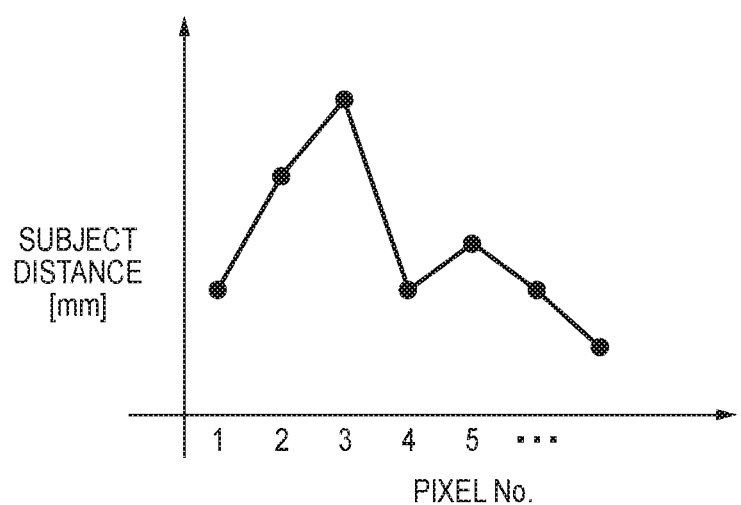
FIGS. 9A and 9B are diagrams for explaining the derivation of a distance between pixels along the surface shape of a subject according to the embodiment and exemplary modifications of the present invention.
Figure 9B:
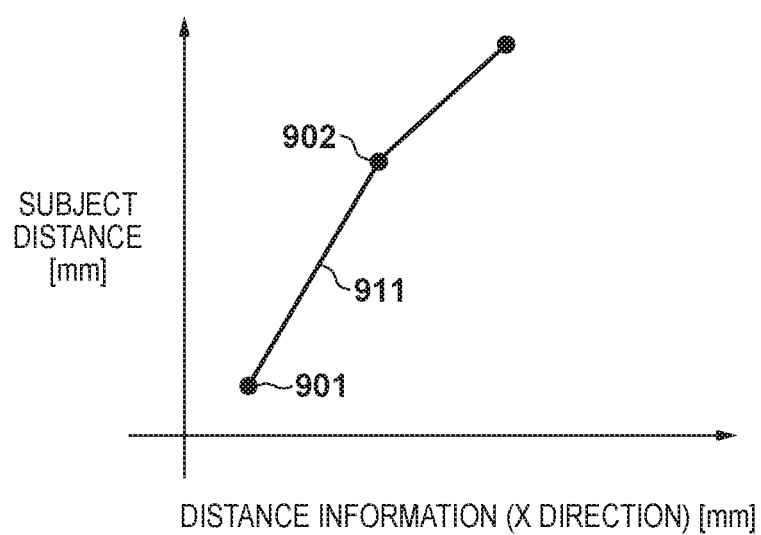

In step S804, based on the subject distance of the target pixel and the subject distance of the next pixel, the ranging unit 108 derives a distance between these pixels along the surface shape of the subject. The following discusses, for example, a case in which the subject distances of respective pixels on the ranging path are distributed as shown in FIG. 9A. In a graph of FIG. 9A, the pixels included in the ranging path are arranged in order on a horizontal axis, starting from the start point, and a vertical axis represents subject distances that have been obtained from the distance information in connection with respective pixels. Here, for example, when the target pixel is pixel "1" and the next pixel is pixel "2", the distance between these two pixels along the surface shape of the subject can be derived as the length of a straight line 911 connecting between points 901 and 902 on a graph that correspond to these pixels as shown in FIG. 9B. Here, coordinates (h, v) of one pixel on the sensor plane are expressed as follows, using coordinates (hb, hv) of this pixel on the captured image and a pixel pitch PX.

$$(h,v)=(hb,hv) \cdot PX$$

Coordinates (H, V) on an xy plane when the coordinates (h, v) on the sensor plane are defocused are expressed as follows, using a defocus amount DEF and a pupil distance L.

$$(H,V)=(h,v) \times (1-DEF/L)$$

Therefore, an xy component (x, y) of each pixel in a three-dimensional space can be derived as follows.

$$(x,y)=(H,V) \times |\text{dist}(\text{dist}\_d+DEF)|$$

Thus, further in consideration of a subject distance z as information of a depth direction, the distance d between the target pixel and the next pixel along the surface shape of the subject can be derived as follows.

$$d=\sqrt{(x_1-x_2)^2+(y_1-y_2)^2+(z_1-z_2)^2}$$

On the other hand, if it is determined in step S803 that it is not possible to use the information of at least one of the subject distances, the ranging unit 108 corrects the information of the subject distance with a low reliability degree based on the subject distances of nearby pixels in step S805. In the present embodiment, for simplicity, it is assumed that pixels located near a pixel having information of a subject distance with a low reliability degree include pixels having information of subject distances with high reliability degrees, and the ranging unit 108 can make a correction using the information of subject distances of the latter pixels.

Figure 10A:
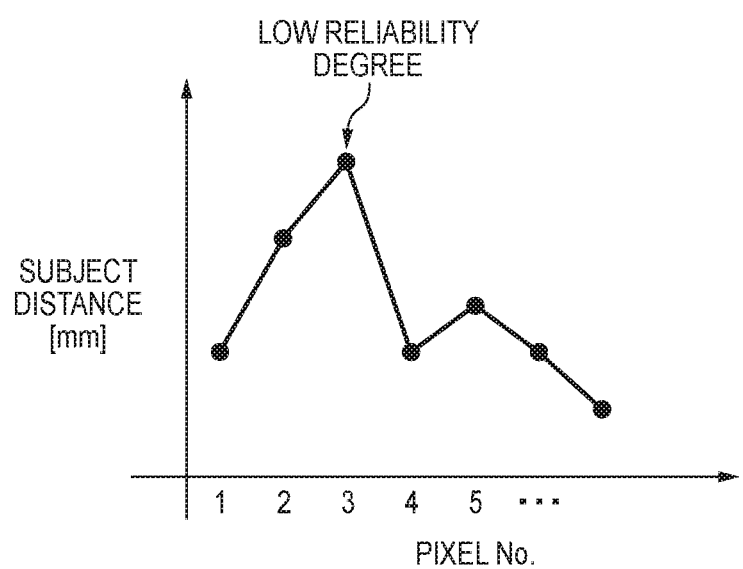
FIGS. 10A and 10B are other diagrams for explaining the derivation of a distance between pixels along the surface shape of a subject according to the embodiment of the present invention.

Here, while the subject distances of respective pixels on the ranging path are distributed as shown in FIG. 10A, it is assumed that, among these, only the subject distance of pixel "3" has a low reliability degree. When the target pixel is pixel "2" and the next pixel is pixel "3", the ranging unit 108 refers to a reliability degree of information of the subject distance of a further following pixel "4" (the next pixel following). At this time, as the reliability degree of the information of the subject distance of the next pixel following is higher than the threshold, the ranging unit 108 derives the value of the subject distance of the next pixel using the value of the subject distance of the target pixel and the value of the subject distance of the next pixel following, and makes a correction so as to use the derived value as the subject distance. More specifically, the control unit 101 derives an average value of the subject distances of two pixels (the target pixel and the next pixel following) that are adjacent to the next pixel, and sets the average value as the value of the subject distance of the next pixel. That is to say, when there is a pixel having information of a subject distance with a low reliability degree, the ranging unit 108 generates a subject distance through interpolation, as indicated by a point 1001 in FIG. 10B, using the subject distances of immediately preceding and succeeding pixels with high reliability degrees. In this way, the use of information of a subject distance with a low reliability degree can be avoided, and a distance along the surface shape of the subject can be derived with higher precision.

In step S806, based on the subject distance of the target pixel that was corrected in step S805 and the subject distance of the next pixel, the ranging unit 108 derives the distance between these pixels along the surface shape of the subject. Computation performed in the present step may be similar to that of step S804.

In step S807, the ranging unit 108 determines whether all of the pixels other than the pixel at the end point have been selected as the target pixel from among the pixels included in the ranging path. If the ranging unit 108 determines that all of the pixels other than the pixel at the end point have been selected as the target pixel, processing proceeds to step S808, and if the ranging unit 108 determines that they have not been selected, processing returns to step S802.

In step S808, the ranging unit 108 derives a path length related to the entire ranging path along the surface shape of the subject (a measurement result) by adding the distances along the surface shape of the subject that have been derived with respect to all of the pixels that have been selected as the target pixel, and completes the present ranging processing.

On the other hand, if it is determined in step S603 of the measurement processing that the ranging path is the path that does not take into account the surface shape of the subject, the ranging unit 108, under control of the control unit 101, derives the distance that does not take into account the surface shape of the subject (the shortest distance) with respect to the ranging path as a measurement result in step S605. Computation of the present step may be performed by performing the processing of step S803 of the ranging processing using pixels at the start point and the end point of the ranging path as a target.

In step S606, the control unit 101 causes the display unit 109 to display information of the measurement result that was derived in the ranging processing of step S604 or the computation of step S605, and completes the present measurement processing.

In the above-described manner, the digital camera 100 of the present embodiment can measure a surface length in consideration of the shape of a subject. More specifically, with respect to a ranging path set by the user, the digital camera 100 can derive a path length in consideration of the surface shape of the subject, or the shortest distance without consideration of the surface shape.

First Exemplary Modification

The ranging processing of the above-described embodiment has been described under the assumption that pixels located near a pixel having information of a subject distance with a low reliability degree include pixels having information of subject distances with high reliability degrees, and the ranging unit 108 can make a correction using the information of subject distances of the latter pixels. Meanwhile, as a region having high luminance and a region having low contrast could possibly appear over a wide range in a captured image, pixels from which subject distances with high reliability degrees have been derived do not necessarily exist nearby.

Therefore, if it is determined that it is not possible to use the information of at least one of the subject distances, the ranging unit 108 may determine whether it is possible to correct the information of the subject distance with a low reliability degree based on the subject distances of nearby pixels. Whether the correction is possible may be determined based on whether a range of a predetermined number of pixels centered at a pixel with a low reliability degree includes a prescribed number of pixels from which subject distances with high reliability degrees have been obtained, such as when subject distances with high reliability degrees have been obtained from two pixels that adjacently precede and succeed a pertinent pixel. In other words, it is permissible to determine that the correction is not possible with respect to a section in which a predetermined number of pixels having subject distances with low reliability degrees exist in a row on the ranging path.

Figure 10B:
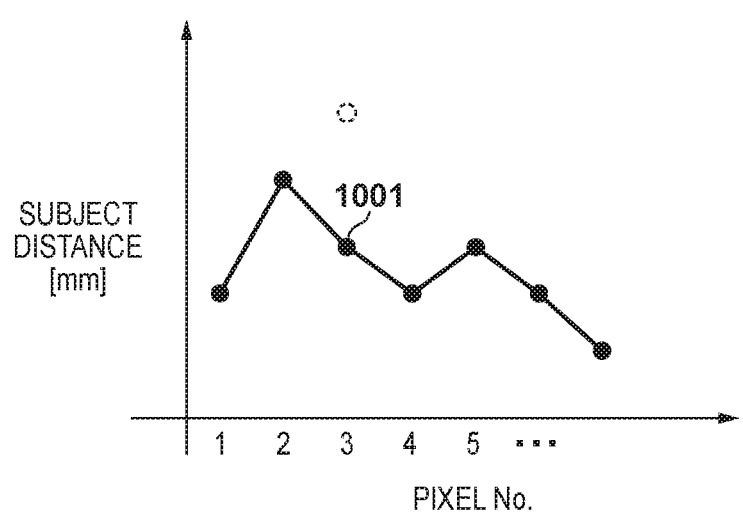
Figure 11A:
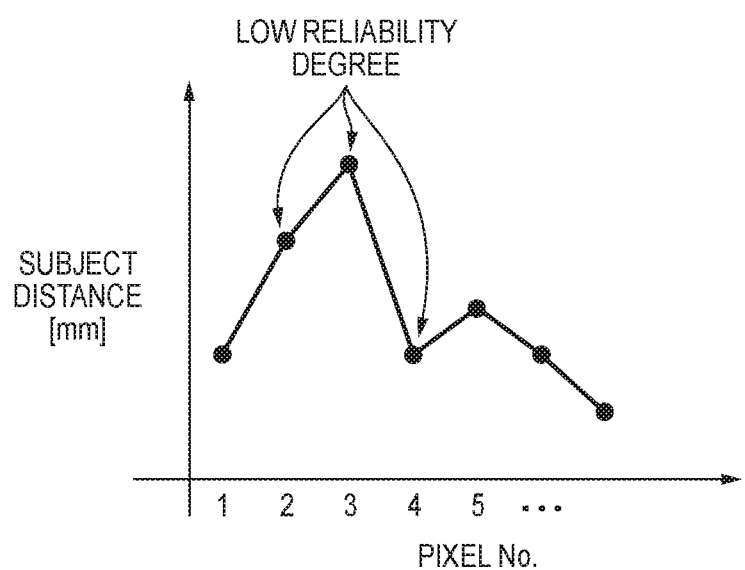
FIGS. 11A and 11B are diagrams for explaining the derivation of a distance between pixels along the surface shape of a subject according to a first exemplary modification of the present invention.

Here, the subject distances of respective pixels on the ranging path are distributed as shown in FIG. 11A, which is different from the mode shown in FIGS. 10A and 10B; a description is now given of an example in which, among these, the subject distances of pixels "2", "3", and "4" have low reliability degrees. At this time, when pixels with high reliability degrees do not exist near a pixel having information of a subject distance with a low reliability degree, such as when the target pixel is pixel "1" and the next pixel is pixel "2", it may not be possible to make a favorable correction.

Figure 11B:
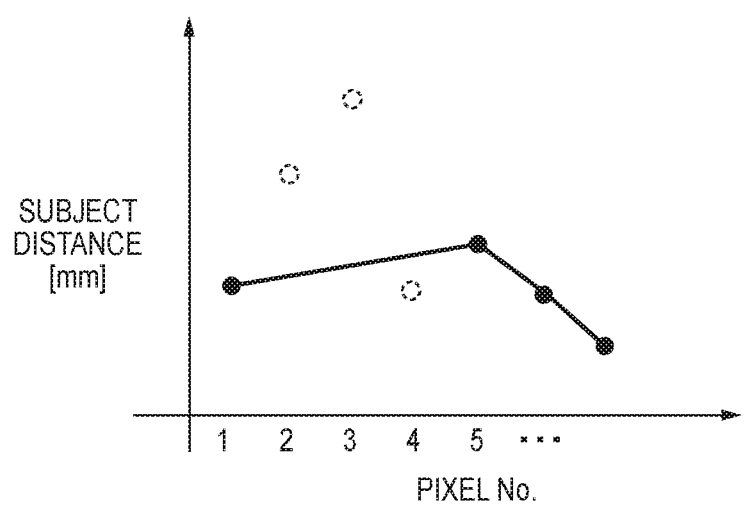

In this case, as shown in FIG. 11B, rather than correcting the subject distance with a low reliability degree, the ranging unit 108 may specify the next pixel from which information of a subject distance with a high reliability degree has been obtained on the ranging path, and use the specified next pixel in deriving a path length. That is to say, it is permissible to exclude elements of the surface shape of a subject with respect to a section of pixels having information of subject distances with low reliability degrees on the ranging path (such elements are assumed to be flat), and derive the path length of the ranging path only using pixels from which subject distances with high reliability degrees have been obtained. In the example shown in the figures, assuming that it is not possible to correct the subject distances with respect to a section of pixel "2" to pixel "4", the ranging unit 108 may derive a path length of a section of pixel "1" to pixel "5" based on the subject distance of pixel "1" and the subject distance of pixel "5". Partially excluding the uncertain surface shape of the subject in the foregoing manner can reduce derivation of an erroneous path length along the surface shape of the subject.

Second Exemplary Modification

Although the above-described embodiment and first exemplary modification have been described under the assumption that a path length of a ranging path along the surface shape of a subject is derived with reference to subject distances of only pixels included in the ranging path, the present invention is not limited to being embodied in this manner. For example, as shown in FIG. 12A, it is permissible to provide one or more auxiliary paths that are in the vicinity of the ranging path and have a start point and an end point at coordinates that are displaced from a start point and an end point of the ranging path by a predetermined number of pixels, and use an average value of the path lengths that have been derived with respect to these paths, including the ranging path, as a measurement result.

More specifically, as shown in FIG. 12B, when a ranging path 1201 is set in a captured image based on a start point 1202 and an end point 1203, auxiliary paths 1204 and 1207 may be defined by displacing the start point 1202 and the end point 1203 by one pixel in the positive and negative directions of a y-axis. That is to say, the auxiliary path 1204 may be defined by a start point 1205 at a position that is displaced from the start point 1202 by one pixel in the negative direction of the y-axis, and an end point 1206 at a position that is displaced from the end point 1203 by one pixel in the negative direction of the y-axis. Also, the auxiliary path 1207 may be defined by a start point 1208 at a position that is displaced from the start point 1202 by one pixel in the positive direction of the y-axis, and an end point 1209 at a position that is displaced from the end point 1203 by one pixel in the positive direction of the y-axis.

Alternatively, as shown in FIG. 12C, it is permissible to use auxiliary paths 1211 and 1214 that are defined by displacing the start point 1202 and the end point 1203 by one pixel in the positive and negative directions of an x-axis. That is to say, the auxiliary path 1211 may be defined by a start point 1212 at a position that is displaced from the start point 1202 by one pixel in the negative direction of the x-axis, and an end point 1203 at a position that is displaced from the end point 1203 by one pixel in the negative direction of the x-axis. Also, the auxiliary path 1214 may be defined by a start point 1215 at a position that is displaced from the start point 1202 by one pixel in the positive direction of the x-axis, and an end point 1216 at a position that is displaced from the end point 1203 by one pixel in the positive direction of the x-axis.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-046379, filed Mar. 13, 2019, which is hereby incorporated by reference herein in its entirety.

What is claimed is:

1. A three-dimensional measurement apparatus, comprising:
   at least one processor; and
   a memory storing an instruction that, when executed by the at least one processor, causes the at least one processor to function as:
     an operational input unit configured to accept an operational input,
     a determination unit configured to determine a ranging path based on a trajectory of operational inputs that have been continuously accepted by the operational input unit,
     an obtaining unit configured to obtain, with respect to a captured image, distance information including information of subject distances in the captured image, the subject distances being distances to a subject, and
     a derivation unit configured to derive a three-dimensional path length corresponding to the ranging path along a surface shape of the subject based on subject distances in the captured image that are included in the ranging path determined by the determination unit.

2. The three-dimensional measurement apparatus according to claim 1, wherein
   a start point and an end point of the ranging path have been set, and
   the derivation unit derives the path length by
     sequentially selecting pixels included in the ranging path as a target pixel starting from the start point,
     based on a difference between subject distances of the target pixel and a next pixel that is included in the ranging path and adjacent to the target pixel, deriving a distance between the two pixels along the surface shape of the subject, and
     summing derived distances with respect to the ranging path.

3. The three-dimensional measurement apparatus according to claim 2, wherein
   the distance information includes information of reliability degrees of subject distances based on a state of the subject included in the captured image, and
   when the ranging path includes a pixel with a subject distance that does not satisfy a reference reliability degree, the derivation unit derives the path length by correcting the subject distance of the pixel based on subject distances of pixels that exist near the pixel and satisfy the reference reliability degree.

4. The three-dimensional measurement apparatus according to claim 3, wherein
   the derivation unit derives the path length assuming that the surface shape of the subject is flat in a section in which a predetermined number of pixels that do not satisfy the reference reliability degree exist in a row on the ranging path.

5. The three-dimensional measurement apparatus according to claim 3, wherein subject distances of respective pixels in the captured image are derived based on a group of a pair of images having parallax that have been obtained by capturing the same subject from different viewpoints, and reliability degrees of the subject distances of the respective pixels are determined based on at least one of luminances, contrasts, and defocus amounts of pixels that are included in the group of the pair of images with parallax and correspond to the respective pixels.

6. The three-dimensional measurement apparatus according to claim 3, wherein subject distances of respective pixels in the captured image are measured by an optical ranging unit, and reliability degrees of the subject distances of the respective pixels are determined based on an attenuation rate of an amplitude of reflected waves that are detected at the time of measurement performed by the optical ranging unit.

7. The three-dimensional measurement apparatus according to claim 1, wherein the determination unit determines one or more auxiliary paths in addition to the ranging path, and the derivation unit derives, as the path length of the ranging path, an average value of path lengths that have been respectively derived in relation to the ranging path and the one or more auxiliary paths.

8. The three-dimensional measurement apparatus according to claim 1, wherein the instruction further includes an instruction that, when executed by the at least one processor, causes the at least one processor to function as an operational input unit configured to accept an operational input related to determination of the ranging path, the determination unit determines the ranging path based on an operational input that has been accepted by the operational input unit and designates a start point and an end point of the ranging path, and the derivation unit switches between derivation of the path length of the ranging path and derivation of a Euclidean distance between the start point and the end point in a three-dimensional space in accordance with an operational input method that has been used in performing the operational input for designating the start point and the end point.

9. A non-transitory computer-readable recording medium having recorded therein a program for causing a computer to function as each unit of the three-dimensional measurement apparatus according to claim 1.

10. An image capturing apparatus including an image capturing unit configured to capture a captured image and a pair of pupil-division images simultaneously, the image capturing apparatus comprising:

at least one processor; and a memory storing an instruction that, when executed by the at least one processor, causes the at least one processor to function as:

a generation unit configured to generate, based on the pair of pupil-division images, distance information including information of subject distances in the captured image, the subject distances being distances to a subject, an operational input unit configured to accept an operational input a determination unit configured to determine a ranging path based on a trajectory of operational inputs that have been continuously accepted by the operational input unit, and a derivation unit configured to derive a three-dimensional path length corresponding to the ranging path along a surface shape of the subject based on subject distances in the captured image that are included in the ranging path determined by the determination unit.

11. A control method for a three-dimensional measurement apparatus, the control method comprising:

accepting an operational input;

determining a ranging path based on a trajectory of operational inputs that have been continuously accepted;

obtaining, with respect to a captured image, distance information including information of subject distances in the captured image, the subject distances being distances to a subject; and deriving a three-dimensional path length corresponding to the ranging path along a surface shape of the subject based on subject distances in the captured image that are included in the ranging path determined by the determining.

12. A three-dimensional measurement apparatus, comprising:

at least one processor; and a memory storing an instruction that, when executed by the at least one processor, causes the at least one processor to function as:

a determination unit configured to determine, with respect to a captured image, a two-dimensional ranging path that is to undergo distance measurement, an obtaining unit configured to obtain, with respect to the captured image, distance information including information of subject distances in the captured image, the subject distances being distances to a subject, and a derivation unit configured to derive a three-dimensional path length corresponding to the ranging path along a surface shape of the subject based on subject distances in the captured image that are included in the ranging path determined by the determination unit, wherein a start point and an end point of the ranging path have been set, and the derivation unit derives the path length by sequentially selecting pixels included in the ranging path as a target point starting from the start point, based on a difference between subject distances of the target point and a next point that is included in the ranging path and around the target point, deriving a distance between the two points along the surface shape of the subject, and summing derived distances with respect to the ranging path.

13. A non-transitory computer-readable recording medium having recorded therein a program for causing a computer to function as each unit of the three-dimensional measurement apparatus according to claim 12.

14. An image capturing apparatus including an image capturing unit configured to capture a captured image and a pair of pupil-division images simultaneously, the image capturing apparatus comprising:

at least one processor; and a memory storing an instruction that, when executed by the at least one processor, causes the at least one processor to function as:

a generation unit configured to generate, based on the pair of pupil-division images, distance information including information of subject distances in the captured image, the subject distances being distances to a subject,
a determination unit configured to determine, with respect to the captured image, a two-dimensional ranging path that is to undergo distance measurement, and
a derivation unit configured to derive a three-dimensional path length corresponding to the ranging path along a surface shape of the subject based on subject distances in the captured image that are included in the ranging path determined by the determination unit, wherein
a start point and an end point of the ranging path have been set, and
the derivation unit derives the path length by
sequentially selecting pixels included in the ranging path as a target point starting from the start point,
based on a difference between subject distances of the target point and a next point that is included in the ranging path and around the target point, deriving a distance between the two points along the surface shape of the subject, and
summing derived distances with respect to the ranging path.

15. A control method for a three-dimensional measurement apparatus, the control method comprising:
determining, with respect to a captured image, a two-dimensional ranging path that is to undergo distance measurement;
obtaining, with respect to the captured image, distance information including information of subject distances in the captured image, the subject distances being distances to a subject; and
deriving a three-dimensional path length corresponding to the ranging path along a surface shape of the subject based on subject distances in the captured image that are included in the ranging path determined by the determining, wherein
a start point and an end point of the ranging path have been set, and
the path length is derived by
sequentially selecting pixels included in the ranging path as a target point starting from the start point,
based on a difference between subject distances of the target point and a next point that is included in the ranging path and around the target point, deriving a distance between the two points along the surface shape of the subject, and
summing derived distances with respect to the ranging path.

16. A three-dimensional measurement apparatus, comprising:
at least one processor; and
a memory storing an instruction that, when executed by the at least one processor, causes the at least one processor to function as:
an operational input unit configured to accept an operational input,
a determination unit configured to determine a ranging path based on a trajectory of operational inputs that have been continuously accepted by the operational input unit,
an obtaining unit configured to obtain, with respect to a captured image, distance information including information of subject distances in the captured image, the subject distances being distances to a subject, and
a derivation unit configured to derive a three-dimensional path length corresponding to the ranging path along a surface shape of the subject based on subject distances in the captured image that are included in the ranging path determined by the determination unit, wherein
the determination unit determines the ranging path based on an operational input that has been accepted by the operational input unit and designates a start point and an end point of the ranging path, and
the derivation unit switches between derivation of the path length of the ranging path and derivation of a Euclidean distance between the start point and the end point in a three-dimensional space in accordance with an operational input method that has been used in performing the operational input for designating the start point and the end point.

17. A non-transitory computer-readable recording medium having recorded therein a program for causing a computer to function as each unit of the three-dimensional measurement apparatus according to claim 16.

18. An image capturing apparatus including an image capturing unit configured to capture a captured image and a pair of pupil-division images simultaneously, the image capturing apparatus comprising:
at least one processor; and
a memory storing an instruction that, when executed by the at least one processor, causes the at least one processor to function as:
a generation unit configured to generate, based on the pair of pupil-division images, distance information including information of subject distances in the captured image, the subject distances being distances to a subject,
an operational input unit configured to accept an operational input,
a determination unit configured to determine a ranging path based on a trajectory of operational inputs that have been continuously accepted by the operational input unit, and
a derivation unit configured to derive a three-dimensional path length corresponding to the ranging path along a surface shape of the subject based on subject distances in the captured image that are included in the ranging path determined by the determination unit, wherein
the determination unit determines the ranging path based on an operational input that has been accepted by the operational input unit and designates a start point and an end point of the ranging path, and
the derivation unit switches between derivation of the path length of the ranging path and derivation of a Euclidean distance between the start point and the end point in a three-dimensional space in accordance with an operational input method that has been used in performing the operational input for designating the start point and the end point.

19. A control method for a three-dimensional measurement apparatus, the control method comprising:
accepting an operational input
determining a ranging path based on a trajectory of operational inputs that have been continuously accepted;

obtaining, with respect to the captured image, distance information including information of subject distances in a captured image, the subject distances being distances to a subject; and deriving a three-dimensional path length corresponding to the ranging path along a surface shape of the subject based on subject distances in the captured image that are included in the ranging path determined by the determining, and on information of an image capture condition of the captured image, wherein the ranging path is determined based on an operational input that has been accepted and designates a start point and an end point of the ranging path, and the deriving switches between derivation of the path length of the ranging path and derivation of a Euclidean distance between the start point and the end point in a three-dimensional space in accordance with an operational input method that has been used in performing the operational input for designating the start point and the end point.

* * * * *